2,909,647

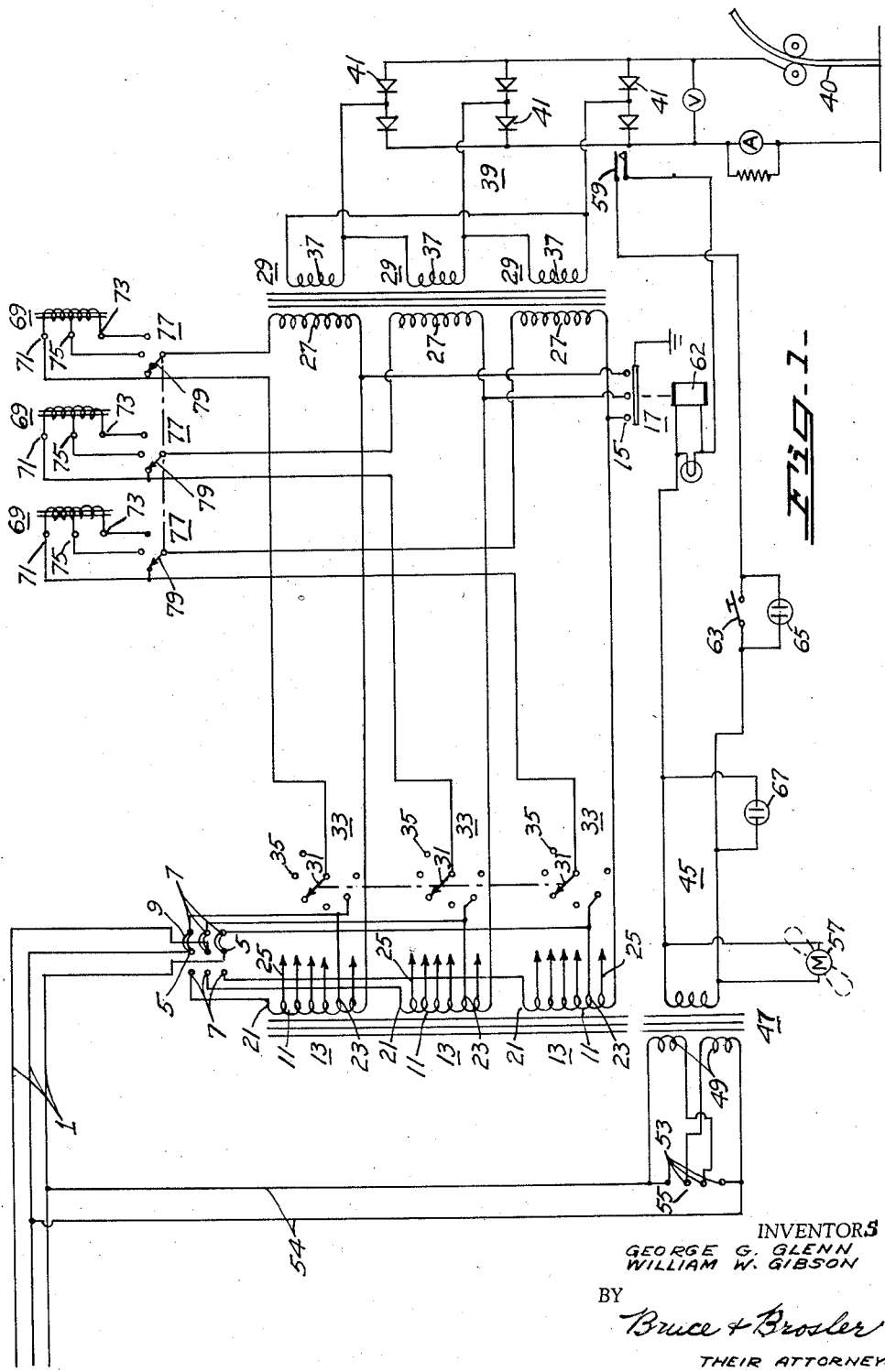

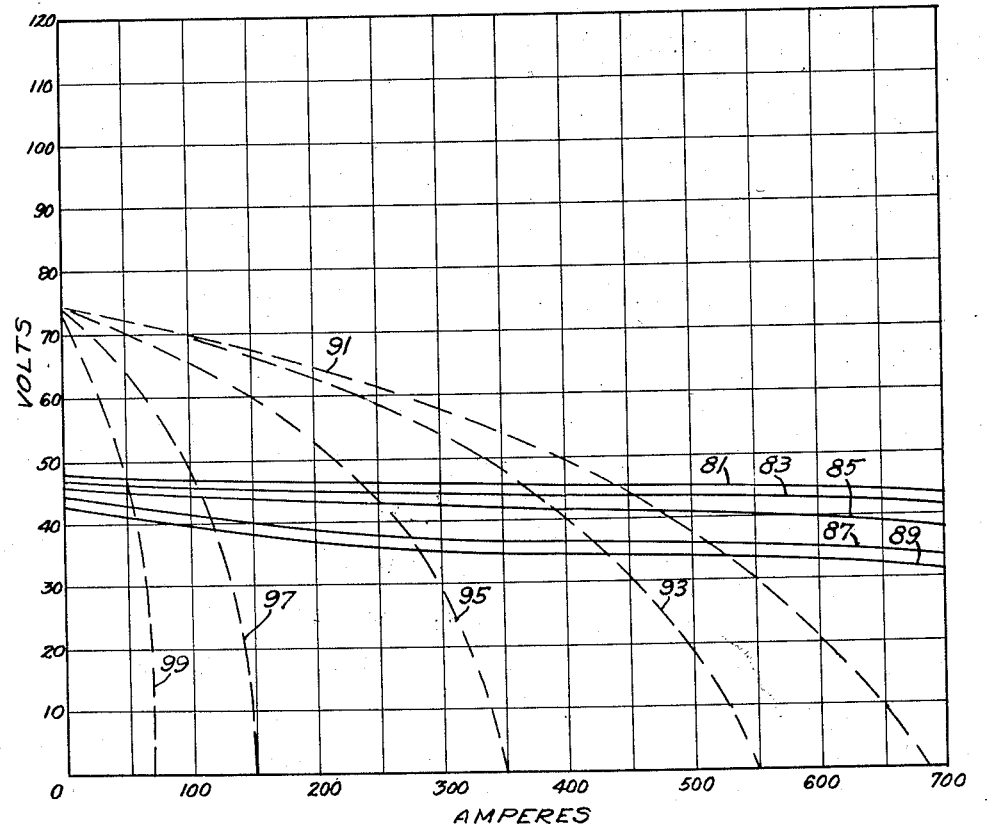

WIDE RANGE POWER SUPPLY SYSTEM FOR WELDING EQUIPMENT

George G. Glenn, Oakland, and William W. Gibson, Alameda, Calif., assignors to Glenn Pacific Power Supply Corp., Oakland, Calif., a corporation of California Application January 18, 1957, Serial No. 634,994

8 Claims. (Cl. 219—131)

Our invention relates to the field of welding and more particularly to a power supply system for welding equipment.

Among the objects of our invention are:

(1) To provide a novel and improved power supply system for welding equipment and more particularly a system to be used in conjunction with automatic or semi-automatic welding apparatus;

(2) To provide a novel and improved power supply system for welding equipment which requires no external voltage controls;

(3) To provide a novel and improved power supply system for welding equipment wherein an arc may be struck almost instantaneously and without necessary recourse to high frequency or use of steel wool;

(4) To provide a novel and improved power supply system for welding equipment, such system being characterized by the fact that it has no basic moving parts and is so simple to operate as to require no skilled labor;

(5) To provide a novel and improved power supply system for welding equipment which is simple to install and maintain;

(6) To provide a novel and improved power supply system for welding equipment whose voltage-current characteristic curve may be varied from that of a substantially constant voltage to one having a moderately drooping characteristic, the range of variation being such as will permit of a constant rate of feed of a motor driven electrode, and thus avoid need for supplemental apparatus as in conventional equipment to instantaneously adjust rate of feed to compensate for changes in arc length;

(7) To provide a novel and improved power supply system of the constant voltage type for welding equipment and which may be selectively modified to provide a voltage-current curve having a moderately drooping characteristic, such as will permit of a constant rate of feed of a motor driven electrode;

(8) To provide a novel and improved power supply system for welding equipment which is quite flexible in its application to welding problems of various types;

(9) To provide a novel and improved power supply system for welding equipment which may be adjusted to handle both heavy-current and low-current density welding;

(10) To provide a novel and improved power supply system for welding equipment which enables control of the arc characteristic to the extent of adapting the power supply for inert gas welding of light gauge metals with small electrodes, particularly on such metals as aluminum, stainless and non-ferrous alloys.

Additional objects of our invention will be brought out in the following description of an embodiment of the same taken in conjunction with the accompanying drawings wherein, Figure 1 is a circuit diagram illustrative of the present invention and based on the circuit of Figure 1 of the application of George G. Glenn et al. for Constant Voltage Power Supply System for Welding Equipment, Serial No. 357,022, filed May 25, 1953, and now Patent No. 2,800,571 issued July 23, 1957.

Figure 2 is a set of curves distinguishing the present invention from conventional welding apparatus of the prior art.

Referring to the drawings for details of our invention, the power supply system illustrated is of the three-phase type, and inasmuch as standardized three-phase power systems may be either at 240 volts or 480 volts, this must be taken into consideration in the development of the system of the present invention, as it is necessary that output or welding voltages be the same regardless of the power line voltage.

With this in mind, the power lines 1 are connected to the center contacts 5 of a switch arrangement involving a similar set of contacts 7 to either side of the center set and a plurality of jumpers 9 adapted to be plugged in to connect each of the center contacts to either of its associated contacts.

The power line voltage is impressed upon the primaries 11 of a plurality of auto-transformers 13, these being preferably connected in Y-formation with the neutral ends connected to normally open contacts 15 of a grounding relay 17.

For application of the 480 volts to the primary windings of the auto-transformers, each contact of one of the associated sets of contacts will be connected to the high voltage extremity 21 of one of the primary windings, while in the case of the 240 volt application, each of the contacts of the other associated set will be connected to an intermediate point 23 thereon, representing the 240 volt point when the 480 volts is applied to the primary.

Secondary voltages from each auto-transformer will be derived by means of a plurality of taps 25 including the point 23, such taps being so spaced electrically as to produce changes of the order of two volts between successive taps, as viewed from the load end of the system. Voltages thus originating at the auto-transformers will be applied to the primaries 27 of output step-down transformers 29.

The secondary tap voltages of each auto-transformer are selectively applicable to the primary winding of an output transformer by connecting one end of each of the primary windings of these output transformers to the neutral connection of the associated auto-transformer, while the other end of each such winding is connected to the contact arm 31 of a tap switch 33 whose contacts 35 correspond in number to, and constitute the terminals of, the secondary voltage taps on the auto-transformers with which it is associated. The tap switches are preferably ganged so as to function in unison.

The secondary windings 37 of the output transformers are preferably delta connected in a full wave rectifier circuit 39 which supplies the resulting direct current voltage to the motor driven electrode 40 of a welding head. The step-down ratio of the output transformers is such as to produce a range of welding voltages which, in a commercial embodiment, may be of the order of 8 to 42 volts, as the contact arm negotiates a complete swing over its associated contacts.

The rectifiers 41 are of the semi-conductive type such as the selenium cell type of rectifier.

As a protection against probable overheating of the rectifier components, we provide a single-phase protective and control circuit 45 which may operate directly off one phase of the power lines, as depicted in the system of the drawings.

This protective and control circuit includes a step-down transformer 47 having a split primary winding 49 of two sections, associated with means for selectively connecting said sections in either a series or parallel arrangement, depending upon the voltage of the power lines.

Such selective connecting means may involve a series of four jumper contacts 53, through the outer ones of which run the connecting lines 54, from the power supply to one end of each primary winding section, while to the intermediate contacts are cross-connected the remaining ends of these primary winding sections.

A jumper 55 connecting the intermediate contacts will accordingly place the two primary winding sections in series, while a pair of jumpers, each connecting one of the intermediate contacts with an end contact will place the two primary winding sections in parallel.

A fan 57 operating off the secondary winding of this transformer, is associated with the rectifier circuit of the system to maintain the same in a cool operating condition. Also associated with the rectifier circuit is a thermal switch 59. This thermal switch is connected in series with the actuating coil 62 of the multiple contact relay 17, across the secondary winding of the protective and control circuit transformer 47.

Accordingly, should the fan for some reason or other fail, and the temperature about the rectifiers rise to a dangerous value, say of the order of 145 degrees Fahrenheit, the thermal switch will open the series circuit through the relay coil and cause the relay contacts to open, thereby cutting off the power.

This protective and control circuit may be opened and closed manually by means of a panel switch 63 inserted in the circuit, and if such opening and closing of the circuit is desired from an external or remote point, an outlet 65 may be connected across the panel switch.

Also connected across the secondary of the protective and control circuit transformer is an outlet 67 from which power may be taken to run the motor of the welding head.

In each of the three-phase leads to the output transformers, there is inserted an adjustable reactance, preferably in the form of a tapped inductive reactor 69 having end terminal connections 71 and 73 and one or more intermediate taps 75 as desired. The reactor connections are terminated at the contacts of switch means which may be in the form of a rotary switch 77, whose contact arm 79 is adapted to sweep the switch contacts and either short out the associated reactor entirely or connect a portion or all of the same into the circuit. By ganging the switches, simultaneous and rapid adjustments may be made.

In lieu of the rotary switch, other switch means may be utilized, such as jumpers for example.

Without the reactors in circuit, the system is essentially devoid of reactance and the voltage, for any setting of the voltage adjusting switches 33, remains substantially constant with changes in welding current. The system, under such conditions, thus constitutes a constant voltage power supply with all the advantages of such a power supply system.

Such system inherently possesses the ability to develop exceptionally high short circuit starting current and recover to normal welding current all within the brief period of time of the order of .1 second. In such short period of time, the surge current can cause the establishment of an arc without undue undercutting or deposition of metal, thereby eliminating any necessity of withdrawing the electrode to establish such arc, as in conventional welding systems.

Further, when such constant voltage power supply system is employed in automatic or semi-automatic welding, the arc is forced to become self-adjusting, which therefore permits the electrode to be fed by its driving motor at a substantially constant rate and accordingly does away with the prior necessity as in conventional equipment, of incorporating therein sensitive supplemental apparatus to adjust rate of feed to compensate for changes in arc length during welding.

By including some reactance in the circuit, the open circuit voltage does not change except perhaps to a minor degree, due to a small voltage drop through the added inductive reactance, but the voltage curve will register an increased drop from no load to full load, the degree of voltage drop depending upon the amount of reactance introduced.

We have found however, that relatively small amounts of inductive reactance may be advantageously added to the system to expand the range of welding operations which may be handled with the system, and further, that the amount of inductive reactance required for accomplishing this expanded range of operations, is sufficiently small compared to the inductive reactance in conventional systems, as to permit continued reliance on a constant rate of feed of the motor driven electrode, and thus maintain simplicity and ruggedness of the equipment.

Referring to Figure 2 of the drawings, the curves indicated are voltage-ampere curves. Curve 81 is typical of the characteristic of applicants' constant voltage supply system when substantially devoid of inductive reactance. Curves 83, 85, 87 and 89 are typical of curves obtained with applicants' system by the addition of relatively small but increasing amounts of inductive reactance in apparatus designed for example, to supply welding current up to approximately 750 amperes and operating at welding voltages in the region just below 50 volts. The resulting relatively shallow droop characteristic of these curves, means that any reasonable change in magnitude of welding current occurring during welding, produces but minor changes in arc voltage, changes which can be tolerated without necessitating the introduction of complex and expensive compensating equipment. We have found that a drop in voltage to approximately 76% of open circuit voltage can be tolerated in welding equipment employing constant feed of the wire electrode, without indicating any material change in starting, burnback or recovery. This represents a maximum permissible drop of approximately 24%.

Contrasting these curves with those numbered 91, 93, 95, 97 and 99, which are typical of conventional type welding equipment, the drooping characteristic is exceedingly sharp, resulting in substantial changes in voltage with but small variations in welding current. Normally such voltage drops as much as 67% from the open circuit voltage to full load voltage, as compared with the drop of only 24% in applicants' system. Such voltage variations produce changes in arc characteristics which cannot be tolerated in welding. This accounts for the fact that complex, sensitive compensating apparatus must be included in conventional type welding equipment to maintain relatively uniform welding conditions at the arc.

As a constant voltage supply system, the system functions at high efficiency and is admirably adapted for repetitive and automatic welding. However, where the nature of the jobs vary and it becomes necessary to change electrodes and adjust to different work characteristics, it has been found that good welding characteristics can be maintained over a much wider range and quicker results can be realized with some reactance in the circuit. Reactance, therefore, will be added under such conditions.

The wider operating range permitted by the introduction of some reactance into the system, adapts the system for hand welding as distinguished from automatic or semi-automatic welding, thus widening the field of usefulness of the system and rendering the same more flexible.

In addition, we have found that the reactors seem to eliminate stubbing and under certain conditions reduces burnbacks, plus giving a very stable and spray type deposit when properly adjusted, on aluminum, stainless and other alloys.

They further act as a flywheel to cushion and reduce sudden marked changes in current, as occur in current surges encountered in difficult welding problems and thus tend to eliminate what might otherwise turn out to be poor or erratic welds. This is particularly true in low-current density welding, such as in inert gas welding of light gauge metals such as aluminum, stainless and non-ferrous alloys, with small electrodes.

We have found also that the flywheel effect of the inductive reactance thus added, improved weld smoothness, quality and appearance on submerged arc and open-arc semi-automatic welding, particularly on roundabout and heavy pass welds where a large fluid puddle is desired. Such added stability also greatly improved twin-electrode welding performance.

It will be apparent therefore, that through the selective introduction of limited amounts of inductive reactance into a constant voltage power supply system for welding, the range of usefulness of such system may be greatly expanded, and while still retaining to a practical degree the advantages inherent in a constant voltage supply system, namely high starting current, fast recovery, the ability to function with a motor driven electrode being fed at a constant rate, and thus permitting of both simple and rugged welding equipment.

Accordingly, while we have disclosed our invention as embodied in one form of constant voltage supply system, the specific circuit details of such system are not controlling but are merely illustrative and we do not desire to be limited in our protection to such specific type of constant voltage supply system, nor do we desire to be limited to the specific location of inductive reaction as illustrated and described except as may be necessitated by the appended claims.

We claim:

1. In combination, welding equipment including motor driven electrode wire feed means; a constant voltage power supply system therefor comprising, a transformer, said transformer having means providing a selection of secondary voltages, means for reducing said secondary voltages to a range of welding voltage values, means for rectifying such voltages of reduced value, said rectifying means including rectifier components of the semi-conductive type, said power supply system being substantially devoid of inductive reactance when operated as a constant voltage power supply system; and means for selectively including reactance of different values in said power supply system, and within a range permitting feed of such electrode wire at a substantially constant rate.

2. In combination, welding equipment including motor driven electrode wire feed means; a constant voltage power supply system therefor comprising, a transformer, said transformer having means providing a selection of secondary voltages, means for reducing said secondary voltages to a range of welding voltage values, means for rectifying such voltages of reduced value, said rectifying means including rectifier components of the semi-conductive type, said power supply system being substantially devoid of inductive reactance when operating as a constant voltage power supply system; and means for selectively including in said power supply system, reactance of desired values within a range permitting feed of such electrode wire at a substantially constant rate, said means involving a reactor having a plurality of leads extending from different points thereon, and switch means in said system and having contacts to which said reactor leads are connected.

3. In combination, welding equipment including motor driven electrode wire feed means; a constant voltage power supply system therefor comprising, a transformer, said transformer having means providing a selection of secondary voltages, means for reducing said secondary voltages to a range of voltage values of the order of twenty to forty-two volts, means for rectifying such voltages of reduced value, said rectifying means including rectifier components of the semi-conductive type, said power supply system being substantially devoid of inductive reactance when operating as a constant voltage power supply system; and means for selectively including in said power supply system, inductive reactance of desired values within a range permitting feed of such electrode wire at a substantially constant rate, said means involving an inductive reactor having a plurality of leads extending from different points thereon, and switch means in circuit with said voltage reducing means and having contacts to which said reactor leads are connected.

4. In combination, welding equipment including motor driven electrode wire feed means; a constant voltage power supply system therefor comprising, a transformer, said transformer having means providing a selection of secondary voltages, means for reducing said secondary voltages to a range of voltage values of the order of twenty to forty-two volts, means for rectifying such voltages of reduced value, said rectifying means including rectifier components of the semi-conductive type, said power supply system being substantially devoid of inductive reactance when operating as a constant voltage power supply system; and means for selectively including in said power supply system, inductive reactance of desired values within a range permitting feed of such electrode wire at a slubstantially constant rate, said means involving an inductive reactor having a plurality of leads extending from different points thereon, and a switch in circuit with said voltage reducing means and having contacts to which said reactor leads are connected.

5. In combination, welding equipment including motor driven electrode wire feed means; a constant voltage power supply system therefor comprising, a transformer, said transformer having means providing a selection of secondary voltages, means for reducing said secondary voltages to a range of welding voltage values, means for rectifying such voltages of reduced value, said rectifying means including rectifier components of the semi-conductive type, said power supply system being substantially devoid of inductive reactance when operating as a constant voltage power supply system; and means for selectively including inductive reactance in said power supply system in an amount insufficient to produce a voltage drop at full load, in excess of twenty-four percent from open circuit voltage whereby a wider range of operation of the system may be realized by maintaining a steady rate of feed of the electrode wire.

6. In combination, a constant voltage power supply system for welding equipment having an electrode, comprising a transformer, means for deriving from said transformer, a direct current welding voltage, said means including a rectifier component of the semi-conductive type, said power supply system being substantially devoid of inductive reactance when operating as a constant voltage power supply system, and means for including in said system, inductive reactance in an amount incapable of producing a voltage drop at full load, in excess of twenty-four percent from open circuit voltage.

7. In combination, a constant voltage power supply system for welding equipment having an electrode, comprising a transformer, means for deriving from said transformer, a direct current welding voltage, said means including a rectifier component of the semi-conductive type, said power supply system being substantially devoid of inductive reactance when operating as a constant voltage power supply system, and means for selectively including in said system, inductive reactance in an amount incapable of producing a voltage drop at full load, in excess of twenty-four percent from open circuit voltage.

8. A power supply system for welding equipment having a motor driven electrode, comprising a transformer, means for selectively deriving from said transformer, voltages within a range of welding voltages, means for rectifying such selectable welding voltages, said rectifier means including rectifier components of the semi-conductive type and said power supply system being substantially devoid of inductive reactance, whereby recovery will be realized in time to permit welding without withdrawal of the electrode or undue undercutting or deposit of metal and whereby such motor driven electrode may be driven at a substantially constant rate, and means for selectively including in said system, inductive reactance of different values and within a range permitting continued feeding of such electrode wire at a substantial constant rate.

References Cited in the file of this patent

UNITED STATES PATENTS

| | | |
|---|---|---|
| 1,452,857 | Uphoff | Apr. 24, 1923 |
| 1,959,513 | Weyandt | May 22, 1934 |
| 2,322,709 | Owen | June 22, 1943 |
| 2,542,852 | Whitesell | Feb. 20, 1951 |
| 2,763,771 | Bichsel | Sept. 18, 1956 |
| 2,777,047 | Stevens | Jan. 8, 1957 |
| 2,800,571 | Glenn et al. | July 23, 1957 |